United States Patent
Shimizu

(10) Patent No.: US 12,482,867 B2
(45) Date of Patent: Nov. 25, 2025

(54) NON-AQUEOUS ELECTROLYTE SOLUTION, ELECTROCHEMICAL DEVICE PRECURSOR, ELECTROCHEMICAL DEVICE, AND METHOD OF PRODUCING ELECTROCHEMICAL DEVICE

(71) Applicant: MITSUI CHEMICALS, INC., Tokyo (JP)

(72) Inventor: Yusuke Shimizu, Ichihara (JP)

(73) Assignee: MITSUI CHEMICALS, INC., Tokyo (JP)

(*) Notice: Subject to any disclaimer, the term of this patent is extended or adjusted under 35 U.S.C. 154(b) by 78 days.

(21) Appl. No.: 17/910,128

(22) PCT Filed: Feb. 7, 2022

(86) PCT No.: PCT/JP2022/004642
§ 371 (c)(1),
(2) Date: Sep. 8, 2022

(87) PCT Pub. No.: WO2022/196176
PCT Pub. Date: Sep. 22, 2022

(65) Prior Publication Data
US 2024/0213548 A1    Jun. 27, 2024

(30) Foreign Application Priority Data

Mar. 18, 2021 (JP) ................. 2021-045217
Aug. 25, 2021 (JP) ................. 2021-137178

(51) Int. Cl.
*H01M 4/505* (2010.01)
*C01G 53/50* (2025.01)
*H01M 4/525* (2010.01)
*H01M 10/0525* (2010.01)
*H01M 10/0567* (2010.01)
(Continued)

(52) U.S. Cl.
CPC ........ *H01M 10/4235* (2013.01); *C01G 53/50* (2013.01); *H01M 4/505* (2013.01); *H01M 4/525* (2013.01); *H01M 10/0525* (2013.01); *H01M 10/0567* (2013.01); *H01M 10/446* (2013.01); *C01P 2006/40* (2013.01)

(58) Field of Classification Search
None
See application file for complete search history.

(56) References Cited

U.S. PATENT DOCUMENTS

| | | |
|---|---|---|
| 2016/0211551 A1 | 7/2016 | Miyasato et al. |
| 2017/0352908 A1* | 12/2017 | Noguchi ............. H01M 10/052 |
| 2018/0241084 A1 | 8/2018 | Miyasato et al. |

(Continued)

FOREIGN PATENT DOCUMENTS

| | | |
|---|---|---|
| CN | 103682443 B | 3/2016 |
| CN | 107889541 A | 4/2018 |

(Continued)

OTHER PUBLICATIONS

Z. Chen, W.Q. Lu, J. Liu, K. Amine. LiPF6/LiBOB blend salt electrolyte for high-power lithium-ion batteries, Electrochimica Acta 51 (2006) 3322-3326.*

(Continued)

*Primary Examiner* — Carlos Barcena
(74) *Attorney, Agent, or Firm* — BUCHAN INGERSOLL & ROONEY PC

(57) ABSTRACT

A non-aqueous electrolyte solution contains a chain sulfone compound (I) represented by Formula (I) and a cyclic sulfone compound (II) represented by Formula (II). The content of the chain sulfone compound (I) is from 0.01% by mass to 10% by mass with respect to the total amount of the non-aqueous electrolyte solution. In Formula (I), each of $R^{11}$ and $R^{12}$ independently represents an alkyl group, or a fluorinated alkyl group. In Formula (II), $R^{21}$ represents an alkylene group, an alkenylene group, or a group represented by Formula (ii-1); and * represents a binding site; in which in Formula (ii-1), $R^{22}$ represents a hydrogen atom, an alkyl group, or a group represented by Formula (ii-2); and $R^{23}$ represents an alkyl group, or a group represented by Formula (ii-2).

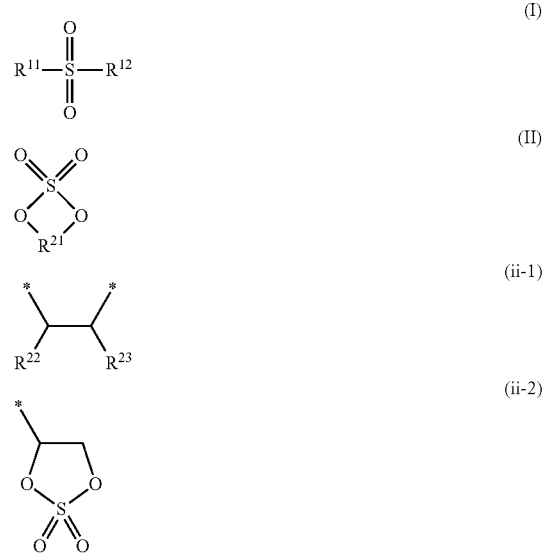

10 Claims, 1 Drawing Sheet

(51) Int. Cl.
*H01M 10/42* (2006.01)
*H01M 10/44* (2006.01)

(56) References Cited

U.S. PATENT DOCUMENTS

| | | | |
|---|---|---|---|
| 2021/0203001 A1 | 7/2021 | Chen et al. | |
| 2021/0296703 A1 | 9/2021 | Sugawara et al. | |

FOREIGN PATENT DOCUMENTS

| | | |
|---|---|---|
| CN | 110943253 A | 3/2020 |
| CN | 109841915 B | 10/2020 |
| CN | 112470320 A | 3/2021 |
| EP | 3146588 B1 | 7/2018 |
| EP | 3570351 A1 | 11/2019 |
| EP | 3832773 A1 | 6/2021 |
| JP | 2014049294 A | 3/2014 |
| KR | 20160002314 A | 1/2016 |
| WO | 2020063882 A1 | 4/2020 |
| WO | 2020063885 A1 | 4/2020 |

OTHER PUBLICATIONS

D. Y. Wang, A. Xiao, L. Wells, J. R. Dahn. Effect of Mixtures of Lithium Hexafluorophosphate (LiPF6) and Lithium Bis(fluorosulfonyl) imide (LiFSI) as Salts in Li[Ni1/3Mn1/3Co1/3]O2/Graphite Pouch Cells, Journal of the Electrochemical Society, 162 (1) A169-A175 (2015).*

C. Wang, L. Yu, W. Fan, J. Liu, L. Ouyang, L. Yang, M. Zhu. Lithium Difluorophosphate as a Promising Electrolyte Lithium Additive for High-Voltage Lithium-Ion Batteries, ACS Appl. Energy Mater. 2018, 1, 2647-2656.*

Extended European Search Report dated Sep. 12, 2025 issued for European Patent Application No. 22764290.7-1103, 11 pages.

* cited by examiner

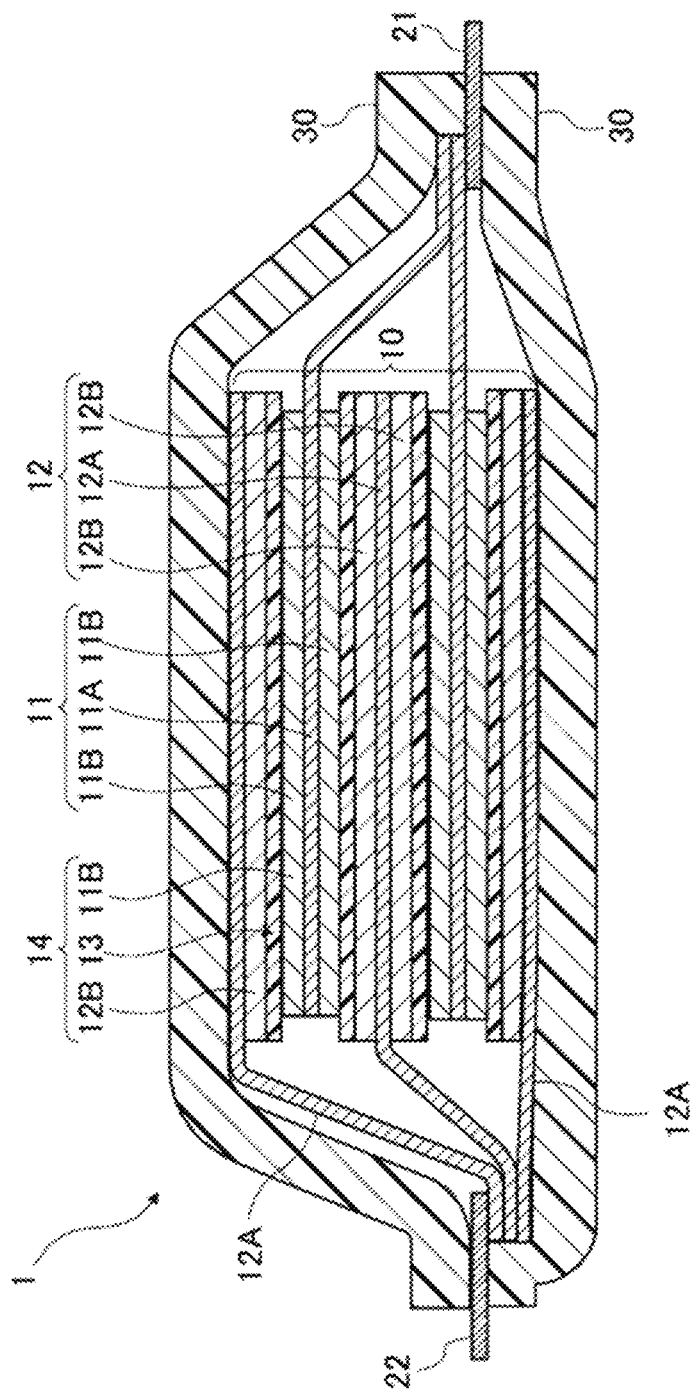

NON-AQUEOUS ELECTROLYTE SOLUTION, ELECTROCHEMICAL DEVICE PRECURSOR, ELECTROCHEMICAL DEVICE, AND METHOD OF PRODUCING ELECTROCHEMICAL DEVICE

TECHNICAL FIELD

The present disclosure relates to a non-aqueous electrolyte solution, an electrochemical device precursor, an electrochemical device, and a method of producing an electrochemical device.

BACKGROUND ART

Lithium-ion secondary batteries are drawing attention as batteries having a high energy density.

Patent Document 1 discloses a non-aqueous electrolyte solution for a lithium-ion secondary battery. The non-aqueous electrolyte solution specifically disclosed in Patent Document 1 is composed of non-aqueous solvents and lithium salts. The non-aqueous solvents are composed of (trifluoromethyl)methyl sulfone ($CF_3CH_3SO_2$), ethyl methyl carbonate and ethylene carbonate. The lithium salts are composed of $LiPF_6$ and $LiN(FSO_2)_2$.

Patent Document 1: WO 2020/063882

SUMMARY OF THE INVENTION

Technical Problem

However, there is a risk of a decrease in capacity and an increase in direct current resistance, when a lithium-ion secondary battery using the non-aqueous electrolyte solution disclosed in Patent Document 1 is charged or discharged in a high temperature environment.

In view of the above-described circumstance, an object of the present disclosure is to provide: a non-aqueous electrolyte solution which is capable of reducing a decrease in the capacity and an increase in the direct current resistance of an electrochemical device using the electrolyte solution, even when the electrochemical device is stored in a high temperature environment for a long period of time; an electrochemical device precursor and an electrochemical device, using the same; and a method of producing the electrochemical device.

Solution to Problem

Means for solving the problems described above include the following embodiments.

<1> A non-aqueous electrolyte solution, including:
an chain sulfone compound (I) represented by the following Formula (I); and
a cyclic sulfone compound (II) represented by the following Formula (II),
wherein a content of the chain sulfone compound (I) is from 0.01% by mass to 10% by mass with respect to a total amount of the non-aqueous electrolyte solution:

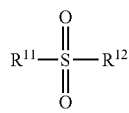
(I)

wherein, in Formula (I), each of $R^{11}$ and $R^{12}$ independently represents an alkyl group having from 1 to 6 carbon atoms, or a fluorinated alkyl group having from 1 to 6 carbon atoms.

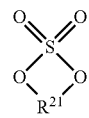
(II)

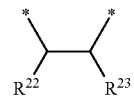
(ii-1)

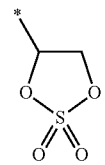
(ii-2)

wherein, in Formula (II), $R^{21}$ represents an alkylene group having from 3 to 6 carbon atoms, an alkenylene group having from 2 to 6 carbon atoms, or a group represented by Formula (ii-1), and * represents a binding site; and wherein, in Formula (ii-1), $R^{22}$ represents a hydrogen atom, an alkyl group having from 1 to 6 carbon atoms, or a group represented by Formula (ii-2), and $R^{23}$ represents an alkyl group having from 1 to 2 carbon atoms, or a group represented by Formula (ii-2).

<2> The non-aqueous electrolyte solution according to the above-described <1>, wherein $R^{11}$ is a fluorinated alkyl group having from 1 to 6 carbon atoms.

<3> The non-aqueous electrolyte solution according to the above-described <1> or <2>, wherein:
$R^{21}$ is a group represented by Formula (ii-1), and
at least one of $R^{22}$ or $R^{23}$ is a group represented by Formula (ii-2).

<4> The non-aqueous electrolyte solution according to any one of the above-described <1> to <3>, further comprising a cyclic carbonate compound (III) containing an unsaturated bond represented by the following Formula (III):

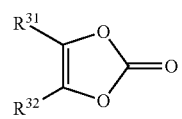
(III)

wherein, in Formula (III), each of $R^{31}$ and $R^{32}$ independently represents a hydrogen atom, a methyl group, an ethyl group, or a propyl group.

<5> The non-aqueous electrolyte solution according to any one of the above-described <1> to <4>, further comprising a sulfonimide lithium salt compound (IV) represented by the following Formula (IV):

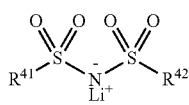

(IV)

wherein, in Formula (IV), each of $R^{41}$ and $R^{42}$ independently represents a fluorine atom, a trifluoromethyl group, or a pentafluoroethyl group.

<6> The non-aqueous electrolyte solution according to any one of the above-described <1> to <5>, further comprising a cyclic dicarbonyl compound (V) represented by the following Formula (V):

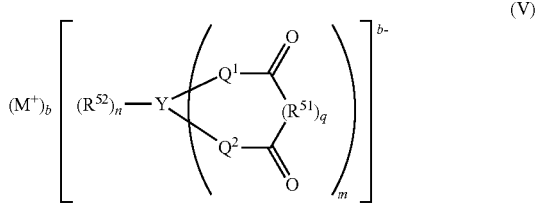

(V)

wherein, in Formula (V),

M represents an alkali metal;

Y represents a transition element, or a group 13 element, a group 14 element or a group 15 element of the periodic table;

b represents an integer from 1 to 3;

m represents an integer from 1 to 4;

n represents an integer from 0 to 8;

q represents 0 or 1;

$R^{51}$ represents an alkylene group having from 1 to 10 carbon atoms, a halogenated alkylene group having from 1 to 10 carbon atoms, an arylene group having from 6 to 20 carbon atoms, or a halogenated arylene group having from 6 to 20 carbon atoms, wherein each of these groups may contain a substituent or a hetero atom in their structure, and in a case in which q is 1 and m is an integer from 2 to 4, a number of $R^{51}$s corresponding to m may be bound to one another;

$R^{52}$ represents a halogen atom, an alkyl group having from 1 to 10 carbon atoms, a halogenated alkyl group having from 1 to 10 carbon atoms, an aryl group having from 6 to 20 carbon atoms, or a halogenated aryl group having from 6 to 20 carbon atoms, wherein each of these groups may contain a substituent or a hetero atom in their structure, and in a case in which n is an integer from 2 to 8, a number of $R^{52}$s corresponding to n may be bound to one another to form a ring; and each of $Q^1$ and $Q^2$ independently represents an oxygen atom or a carbon atom.

<7> The non-aqueous electrolyte solution according to any one of the above-described <1> to <6>, further comprising at least one compound (VI) selected from the group consisting of lithium monofluorophosphate and lithium difluorophosphate.

<8> An electrochemical device precursor, comprising:
a casing; and
a positive electrode, a negative electrode, a separator and an electrolyte solution housed in the casing, wherein:
the positive electrode is configured to occlude and release lithium ions,
the negative electrode is configured to occlude and release lithium ions, and
the electrolyte solution comprises the non-aqueous electrolyte solution according to any one of the above-described <1> to <7>.

<9> The electrochemical device precursor according to the above-described <8>, wherein the positive electrode includes, as a positive electrode active material, a lithium-containing composite oxide represented by the following Formula (X):

$$LiNi_aCo_bMn_cO_2$$    Formula (X)

wherein in Formula (X), each of a, b and c independently represents a number of more than 0 but less than 1; and a total of a, b and c is from 0.99 to 1.00.

<10> A method of producing an electrochemical device, the method including:
preparing the electrochemical device precursor according to and the above-described <8>; and
charging and discharging the electrochemical device precursor.

<11> An electrochemical device obtained by charging and discharging the electrochemical device precursor according to the above-described or <9>.

Advantageous Effects of Invention

The present disclosure provides: a non-aqueous electrolyte solution which is capable of reducing a decrease in the capacity and an increase in the direct current resistance of an electrochemical device using the electrolyte solution, even when the electrochemical device is stored in a high temperature environment for a long period of time; an electrochemical device precursor and an electrochemical device, using the same; and a method of producing the electrochemical device.

BRIEF DESCRIPTION OF DRAWINGS

The FIGURE is a cross-sectional view of an electrochemical device precursor according to an embodiment of the present disclosure.

DESCRIPTION OF EMBODIMENTS

In the present specification, any numerical range indicated using an expression "from * to" represents a range in which numerical values described before and after the "to" are included in the range as a lower limit value and an upper limit value.

In the present specification, the amount of each component in a composition refers, in a case in which a plurality of substances corresponding to each component are present in the composition, to the total amount of the plurality of substances present in the composition, unless otherwise specified.

In the present specification, the term "step" encompasses not only an independent step but also in the case of a step which is not clearly distinguishable from another step as long as a desired object of the step is achieved.

[Non-Aqueous Electrolyte Solution]

A non-aqueous electrolyte solution according to a present embodiment will now be described.

The non-aqueous electrolyte solution is suitably used as an electrolyte solution for an electrochemical device. Examples of the electrochemical device include lithium-ion secondary batteries. Details of the electrochemical device will be described later with reference to the FIGURE.

The non-aqueous electrolyte solution contains an chain sulfone compound (I) represented by the following Formula (I), and a cyclic sulfone compound (II) represented by the following Formula (II). The content of the chain sulfone compound (I) is from 0.01% by mass to 10% by mass with respect to the total amount of the non-aqueous electrolyte solution.

Details of each of the chain sulfone compound (I) and the cyclic sulfone compound (II) will be described later.

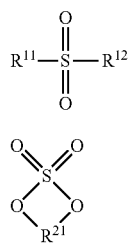

Since the non-aqueous electrolyte solution contains an chain sulfone compound (I) represented by the following Formula (I) and a cyclic sulfone compound (II) represented by the following Formula (II), and the content of the chain sulfone compound (I) is from 0.01% by mass to 10% by mass with respect to the total amount of the non-aqueous electrolyte solution, a decrease in the capacity and an increase in the direct current resistance of an electrochemical device using the same can be suppressed, even when the electrochemical device is stored in a high temperature environment for a long period of time.

The fact that a decrease in the capacity and an increase in the direct current resistance can be suppressed even when the electrochemical device is stored in a high temperature environment for a long period of time, is assumed to be mainly due to the following reasons.

When an electrochemical device according to the present disclosure is subjected to charging and/or discharging (hereinafter, referred to as "charge-discharge" or "charging and discharging"), it is thought that a solid electrolyte interface (SEI) film (hereinafter, referred to as "SEI film") is formed on a surface of a negative electrode and on a surface of a positive electrode.

In a case in which the SEI film on the negative electrode and the SEI film on the positive electrode are not distinguished from each other, the SEI film on the negative electrode and the SEI film on the positive electrode are hereinafter each also simply referred to as "SEI film" or both collectively as "SEI films".

The SEI films are thought to be formed mainly from lithium ions in the non-aqueous electrolyte solution and a decomposition product(s) of the non-aqueous electrolyte solution decomposed due to charging and discharging of the electrochemical device.

When the SEI films are formed, it is thought that side reactions, which are not an original battery reaction, are less likely to proceed in charge-discharge cycles of the electrochemical device, even when the electrochemical device is stored in a high temperature environment for a long period of time. The battery reaction refers to a reaction in which lithium ions enter and exit (intercalate) the positive electrode and the negative electrode. The side reactions include a reductive decomposition reaction of the non-aqueous electrolyte solution by the negative electrode, an oxidative decomposition reaction of the non-aqueous electrolyte solution by the positive electrode, the elution of a metal element in a positive electrode active material, and the like.

In an electrochemical device using the non-aqueous electrolyte solution according to the present embodiment, the SEI films are less likely to have an increased thickness, also in the charge-discharge cycles after being stored in a high temperature environment. Therefore, lithium ions in the non-aqueous electrolyte solution are less easily consumed.

Based on the reasons described above, the non-aqueous electrolyte solution according to the present embodiment is capable of reducing a decrease in the capacity and an increase in the direct current resistance of the electrochemical device, even when the electrochemical device is stored in a high temperature environment for a long period of time.

<Chain Sulfone Compound (I)>

The non-aqueous electrolyte solution contains an chain sulfone compound (I) represented by the following Formula (I):

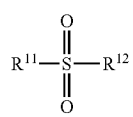

In Formula (I), each of $R^{11}$ and $R^{12}$ independently represents an alkyl group having from 1 to 6 carbon atoms, or a fluorinated alkyl group having from 1 to 6 carbon atoms.

In Formula (I), a hydrocarbon group having from 1 to 6 carbon atoms represented by each of $R^{11}$ and $R^{12}$ may be a linear hydrocarbon group, or may be a hydrocarbon group having a branched structure and/or a ring structure.

In Formula (I), the hydrocarbon group having from 1 to 6 carbon atoms represented by each of $R^{11}$ and $R^{12}$ may be, for example an alkyl group having from 1 to 6 carbon atoms, or an alkenyl group having from 1 to 6 carbon atoms. Examples of the alkyl group having from 1 to 6 carbon atoms include methyl group, ethyl group, n-propyl group, isopropyl group, 1-ethylpropyl group, n-butyl group, isobutyl group, sec-butyl group, tert-butyl group, 2-methylbutyl group, 3,3-dimethylbutyl group, n-pentyl group, isopentyl group, neopentyl group, 1-methylpentyl group, n-hexyl group, isohexyl group, sec-hexyl group and tert-hexyl group. Examples of the alkenyl group having from 1 to 6 carbon atoms include vinyl group, 1-propenyl group, allyl group, 1-butenyl group, 2-butenyl group, 3-butenyl group, pentenyl group, hexenyl group, isopropenyl group, 2-methyl-2-propenyl group, 1-methyl-2-propenyl group and 2-methyl-1-propenyl group.

In Formula (I), the hydrocarbon group having from 1 to 6 carbon atoms represented by each of $R^{11}$ and $R^{12}$ is preferably an alkyl group, an alkenyl group or an alkynyl group, more preferably an alkyl group or an alkenyl group, and particularly preferably an alkyl group.

In Formula (I), the hydrocarbon group having from 1 to 6 carbon atoms represented by each of $R^{11}$ and $R^{12}$ preferably has from 1 to 3 carbon atoms, more preferably one or two carbon atoms, and still more preferably one carbon atom.

In Formula (I), a fluorinated hydrocarbon group having from 1 to 6 carbon atoms represented by each of $R^{11}$ and $R^{12}$ may be a linear fluorinated hydrocarbon group, or may be a fluorinated hydrocarbon group having a branched structure and/or a ring structure.

In Formula (I), the fluorinated hydrocarbon group having from 1 to 6 carbon atoms represented by each of $R^{11}$ and $R^{12}$ may be, for example, a fluoroalkyl group having from 1 to 6 carbon atoms, or a fluoroalkenyl group having from 1 to 6 carbon atoms. Examples of the fluoroalkyl group having from 1 to 6 carbon atoms include fluoromethyl group, difluoromethyl group, trifluoromethyl group, 2,2,2-trifluoroethyl group, 1,1,2,2-tetrafluoroethyl group, perfluoroethyl group, 2,2,3,3-tetrafluoropropyl group, perfluoropropyl group, perfluorobutyl group, perfluoropentyl group, perfluorohexyl group, perfluoroisopropyl group and perfluoroisobutyl group. Examples of the fluoroalkenyl group having from 1 to 6 carbon atoms include 2-fluoroethenyl group, 2,2-difluoroethenyl group, 2-fluoro-2-propenyl group, 3,3-difluoro-2-propenyl group, 2,3-difluoro-2-propenyl group, 3,3-difluoro-2-methyl-2-propenyl group, 3-fluoro-2-butenyl group, perfluorovinyl group, perfluoropropenyl group and perfluorobutenyl group.

In Formula (I), the fluorinated hydrocarbon group having from 1 to 6 carbon atoms represented by each of $R^{11}$ and $R^{12}$ is preferably a fluorinated alkyl group, a fluorinated alkenyl group or a fluorinated alkynyl group, more preferably a fluorinated alkyl group or a fluorinated alkenyl group, and particularly preferably a fluorinated alkyl group.

In Formula (I), the fluorinated hydrocarbon group having from 1 to 6 carbon atoms represented by each of $R^{11}$ and $R^{12}$ preferably has from 1 to 3 carbon atoms, more preferably one or two carbon atoms, and still more preferably one carbon atom.

In Formula (I), $R^{11}$ preferably represents a fluorinated alkyl group having from 1 to 6 carbon atoms. This enables to further reduce a decrease in the capacity and an increase in the direct current resistance of the resulting electrochemical device, even when the electrochemical device is stored in a high temperature environment for a long period of time.

Specific examples of the chain sulfone compound (I) include compounds represented by the following Formulae (I-1) and (I-2):

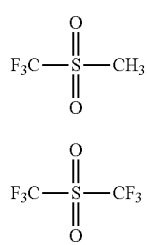

The content of the chain sulfone compound (I) is from 0.01% by mass to 10% by mass, preferably from 0.1% by mass to 5% by mass, and more preferably from 0.3% by mass to 3% by mass, with respect to the total amount of the non-aqueous electrolyte solution. When the content of the chain sulfone compound (I) is within the range described above, an increase in the film thickness of the SEI film can be suppressed, while inhibiting the decomposition of a non-aqueous solvent on the positive electrode or on the negative electrode. The non-aqueous solvent will be described later. When the content of the chain sulfone compound (I) is within the range described above, SEI films having a film thickness which allows for inhibiting the decomposition of the non-aqueous solvent in the non-aqueous electrolyte solution are formed. As a result, properties after high-temperature storage of the electrochemical device are improved.

<Cyclic Sulfone Compound (II)>

The non-aqueous electrolyte solution contains a cyclic sulfone compound (II) represented by the following Formula (II):

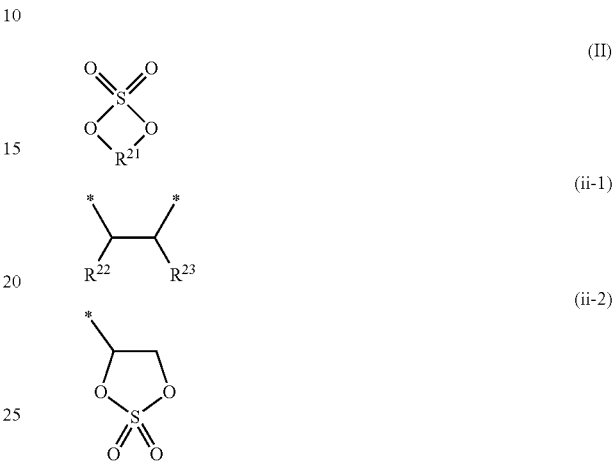

In Formula (II), $R^{21}$ represents an alkylene group having from 3 to 6 carbon atoms, an alkenylene group having from 2 to 6 carbon atoms, or a group represented by Formula (ii-1), and * represents a binding site; and wherein in Formula (ii-1), $R^{22}$ represents a hydrogen atom, an alkyl group having from 1 to 6 carbon atoms, or a group represented by Formula (ii-2), and $R^{23}$ represents an alkyl group having from 1 to 2 carbon atoms, or a group represented by Formula (ii-2).

In Formula (II), $R^{21}$ is preferably a group represented by Formula (ii-1).

In Formula (II), the alkyl group having from 1 to 2 carbon atoms represented by each of $R^{22}$ and $R^{23}$ more preferably has one carbon atom.

In particular, it is preferred, in Formula (II), that $R^{21}$ is a group represented by Formula (ii-1), and that at least one of $R^{22}$ or $R^{23}$ is a group represented by Formula (ii-2). This enables to further reduce a decrease in the capacity and an increase in the direct current resistance of the resulting electrochemical device, even when the electrochemical device is stored in a high temperature environment for a long period of time.

Specific examples of the cyclic sulfone compound (II) include compounds represented by the following Formulae (II-1) and (II-2):

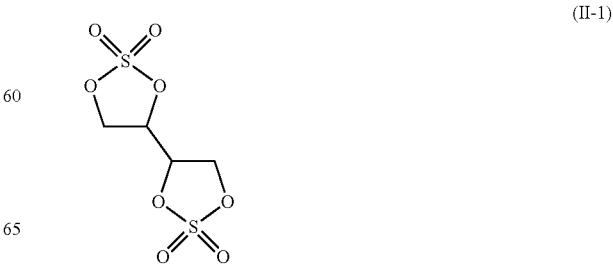

-continued (II-2)

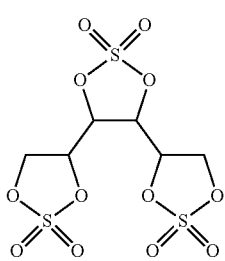

The content of the cyclic sulfone compound (II) is preferably from 0.10% by mass to 10.0% by mass, more preferably from 0.20% by mass to 5.0% by mass, and still more preferably from 0.30% by mass to 3.0% by mass, with respect to the total amount of the non-aqueous electrolyte solution. When the content of the cyclic sulfone compound (II) is within the range described above, an increase in the film thickness of the SEI film can be suppressed, while inhibiting the decomposition of the non-aqueous solvent on the positive electrode or on the negative electrode. When the content of the cyclic sulfone compound (II) is within the range described above, SEI films having a film thickness which allows for inhibiting the decomposition of the non-aqueous solvent in the non-aqueous electrolyte solution are formed. As a result, the properties after high-temperature storage of the electrochemical device are improved.

<Cyclic Carbonate Compound (III)>

The non-aqueous electrolyte solution preferably further contains a cyclic carbonate compound (III) containing an unsaturated bond represented by the following Formula (III):

(III)

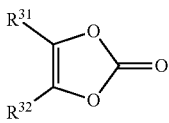

In Formula (III), each of $R^{31}$ and $R^{32}$ independently represents a hydrogen atom, a methyl group, an ethyl group, or a propyl group.

When the non-aqueous electrolyte solution further contains the cyclic carbonate compound (III) in addition to the chain sulfone compound (I) and the cyclic sulfone compound (II), a decrease in the capacity and an increase in the direct current resistance of the resulting electrochemical device can further be suppressed, even when the electrochemical device is stored in a high temperature environment for a long period of time.

This effect is assumed to be due to the following reason.

The cyclic carbonate compound (III) is reductively decomposed by the negative electrode before the non-aqueous electrolyte solution is reductively decomposed on the negative electrode also in the charge-discharge cycles after being stored in a high temperature environment, thereby facilitating the formation of the SEI film. This inhibits the decomposition of the non-aqueous electrolyte solution on the negative electrode. As a result, an increase in the direct current resistance of the electrochemical device is further suppressed.

Specific examples of the cyclic carbonate compound (III) include compounds represented by the following Formulae (III-1) to (III-7):

(III-1)
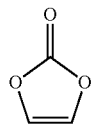

(III-2)
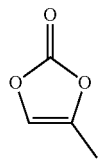

(III-3)
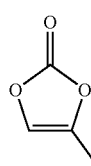

(III-4)
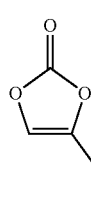

(III-5)
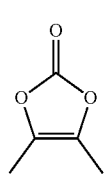

(III-6)
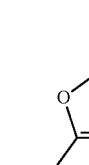

(III-7)
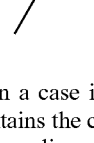

In a case in which the non-aqueous electrolyte solution contains the cyclic carbonate compound (III), the content of the cyclic carbonate compound (III) is preferably from 0.10% by mass to 10.0% by mass, more preferably from 0.20% by mass to 5.0% by mass, and still more preferably from 0.30% by mass to 3.0% by mass, with respect to the total amount of the non-aqueous electrolyte solution. When the content of the cyclic carbonate compound (III) is within the range described above, an increase in the film thickness of the SEI film can be suppressed, while inhibiting the decomposition of the non-aqueous solvent on the positive electrode or on the negative electrode. As a result, the properties after high-temperature storage of the electrochemical device are improved. When the content of the cyclic carbonate compound (III) is within the range described above, SEI films having a film thickness which allows for inhibiting the decomposition of the non-aqueous solvent in the non-aqueous electrolyte solution are formed. As a result, the properties after high-temperature storage of the electrochemical device are improved.

<Sulfonimide Lithium Salt Compound (IV)>

The non-aqueous electrolyte solution preferably further contains a sulfonimide lithium salt compound (IV) represented by the following Formula (IV):

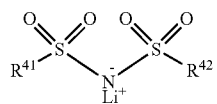
(IV)

In Formula (IV), each of $R^{41}$ and $R^{42}$ independently represents a fluorine atom, a trifluoromethyl group, or a pentafluoroethyl group.

When the non-aqueous electrolyte solution further contains the sulfonimide lithium salt compound (IV) in addition to the chain sulfone compound (I) and the cyclic sulfone compound (II), a decrease in the capacity and an increase in the direct current resistance of the resulting electrochemical device can further be suppressed, even when the electrochemical device is stored in a high temperature environment for a long period of time.

This effect is assumed to be due to the following reason.

The sulfonimide lithium salt compound (IV) is oxidatively decomposed by the positive electrode before the non-aqueous electrolyte solution is reductively decomposed on the negative electrode, after the electrochemical device has been stored in a high temperature environment, thereby facilitating the formation of the SEI film. This inhibits the decomposition of the non-aqueous electrolyte solution on the positive electrode. As a result, an increase in the direct current resistance of the electrochemical device is further suppressed, even when the electrochemical device is stored in a high temperature environment for a long period of time.

Specific examples of the sulfonimide lithium salt compound (IV) as an additive include compounds represented by the following Formulae (IV-1) to (IV-3):

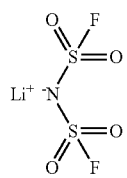
(IV-1)

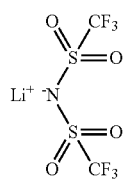
(IV-2)

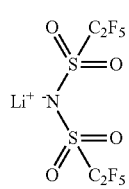
(IV-3)

In a case in which the non-aqueous electrolyte solution contains the sulfonimide lithium salt compound (IV), the content of the sulfonimide lithium salt compound (IV) is preferably from 0.10% by mass to 10.0% by mass, more preferably from 0.20% by mass to 5.0% by mass, and still more preferably from 0.30% by mass to 3.0% by mass, with respect to the total amount of the non-aqueous electrolyte solution. When the content of the sulfonimide lithium salt compound (IV) is within the range described above, the electrochemical device can operate without the SEI films compromising the conductivity of lithium cations. Further, battery characteristics of the electrochemical device are improved, as the SEI films contain a structure mainly composed of a sulfonimide. When the content of the sulfonimide lithium salt compound (IV) is within the range described above, the SEI films contain a sufficient amount of the structure mainly composed of a sulfonimide. This facilitates the formation of a thermally and chemically stable macromolecule structure. Therefore, the elution of the components of the SEI films which compromises the durability of the SEI films, the degeneration of the SEI films, and the like are less likely to occur, in a high temperature environment. As a result, the durability of the SEI films is improved. Further, an increase in the direct current resistance of the electrochemical device can further be suppressed, even when the electrochemical device is stored in a high temperature environment for a long period of time.

<Cyclic Dicarbonyl Compound (V)>

The non-aqueous electrolyte solution preferably further contains a cyclic dicarbonyl compound (V) represented by the following Formula (V):

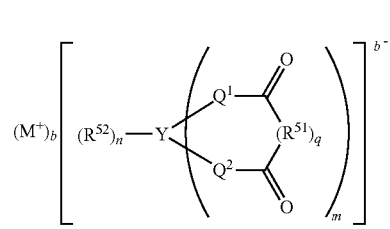
(V)

In Formula (V),

M represents an alkali metal;

Y represents a transition element, or a group 13 element, a group 14 element or a group 15 element of the periodic table;

b represents an integer from 1 to 3;

m represents an integer from 1 to 4;

n represents an integer from 0 to 8;

q represents 0 or 1;

$R^{51}$ represents an alkylene group having from 1 to 10 carbon atoms, a halogenated alkylene group having from 1 to 10 carbon atoms, an arylene group having from 6 to 20 carbon atoms, or a halogenated arylene group having from 6 to 20 carbon atoms, wherein each of these groups may contain a substituent or a hetero atom in their structure, and in a case in which q is 1 and m is an integer from 2 to 4, a number of $R^{51}$s corresponding to m may be bound to one another);

$R^{52}$ represents a halogen atom, an alkyl group having from 1 to 10 carbon atoms, a halogenated alkyl group having from 1 to 10 carbon atoms, an aryl group having from 6 to 20 carbon atoms, or a halogenated aryl group having from 6 to 20 carbon atoms, wherein each of these groups may contain a substituent or a hetero atom in their structure, and in a case in which n is an integer from 2 to 8, a number of $R^{52}$s corresponding to n may be bound to one another to form a ring; and each of $Q^1$ and $Q^2$ independently represents an oxygen atom or a carbon atom.

When the non-aqueous electrolyte solution contains the cyclic dicarbonyl compound (V) in addition to the chain sulfone compound (I) and the cyclic sulfone compound (II), a decrease in the capacity and an increase in the direct current resistance of the resulting electrochemical device is further suppressed, also in the charge-discharge cycles after high-temperature storage.

This effect is assumed to be due to the following reason.

When the non-aqueous electrolyte solution contains the cyclic dicarbonyl compound (V) in addition to the chain sulfone compound (I) and the cyclic sulfone compound (II), the SEI films can contain a bond derived from the cyclic dicarbonyl compound (V) in addition to the above-described reaction products and the like, in the interior thereof. This facilitates the formation of a thermally and chemically stable macromolecule structure. Therefore, the elution of the components of the SEI films which compromises the durability of the SEI films, the degeneration of the SEI films, and the like are less likely to occur, in a high temperature environment. As a result, a decrease in the capacity and an increase in the direct current resistance of the electrochemical device is further suppressed, also in the charge-discharge cycles after being stored in a high temperature environment for a long period of time.

M represents an alkali metal. The alkali metal may be, for example, lithium, sodium, or potassium. In particular, M is preferably lithium.

Y represents a transition element, or a group 13 element, a group 14 element or a group 15 element of the periodic table. Y is preferably Al, B, V, Ti, Si, Zr, Ge, Sn, Cu, Y, Zn, Ga, Nb, Ta, Bi, P, As, Sc, Hf or Sb, and more preferably Al, B or P. In a case in which Y is Al, B or P, an anion compound can be synthesized relatively easily, enabling to reduce production cost.

b represents a valence of the anion and the number of cations. b is an integer from 1 to 3, and is preferably 1. When b is 3 or less, a salt of the anion compound is more easily dissolved in a mixed organic solvent.

Each of m and n is a value related to the number of ligands. Each of m and n is determined by the type of M. m represents an integer from 1 to 4. n represents an integer from 0 to 8.

q represents 0 or 1. In a case in which q is 0, the resulting chelate ring will be a five-membered ring, and in a case in which q is 1, the chelate ring will be a six-membered ring.

$R^{51}$ represents an alkylene group having from 1 to 10 carbon atoms, a halogenated alkylene group having from 1 to 10 carbon atoms, an arylene group having from 6 to 20 carbon atoms, or a halogenated arylene group having from 6 to 20 carbon atoms. The above-described alkylene group, halogenated alkylene group, arylene group or halogenated arylene group may contain a substituent or a hetero atom in the structure thereof. Specifically, each of these groups may contain a substituent instead of a hydrogen atom thereof. The substituent may be, for example, a halogen atom, an chain or cyclic alkyl group, an aryl group, an alkenyl group, an alkoxy group, an aryloxy group, a sulfonyl group, an amino group, a cyano group, carbonyl group, an acyl group, an amide group, or a hydroxyl group. Each of these groups may also have a structure in which a nitrogen atom, a sulfur atom or an oxygen atom is introduced instead of a carbon element. In a case in which q is 1 and m is an integer from 2 to 4, a number of $R^{51}$s corresponding to m may be bound to one another. A ligand such as ethylenediaminetetraacetic acid can be mentioned as an example of such a case.

$R^{52}$ represents a halogen atom, an alkyl group having from 1 to 10 carbon atoms, a halogenated alkyl group having from 1 to 10 carbon atoms, an aryl group having from 6 to 20 carbon atoms, or a halogenated aryl group having from 6 to 20 carbon atoms. The above-described alkyl group, halogenated alkyl group, aryl group or halogenated alkyl group may contain a substituent or a hetero atom in the structure thereof, in the same manner as $R^{51}$, and in a case in which n is an integer from 2 to 8, a number of $R^{52}$s corresponding to n may be bound to one another to form a ring. $R^{52}$ is preferably an electron-withdrawing group, and particularly preferably a fluorine atom.

Each of $Q^1$ and $Q^2$ independently represents O or S. In other words, a ligand binds to Y through such a hetero atom.

Specific examples of the cyclic dicarbonyl compound (V) include compounds represented by the following Formulae (V-1) and (V-2):

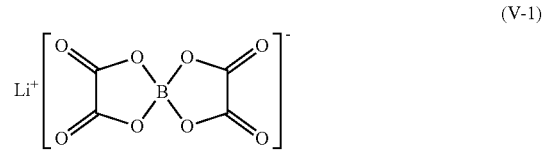

In a case in which the non-aqueous electrolyte solution contains the cyclic dicarbonyl compound (V), the content of the cyclic dicarbonyl compound (V) is preferably from 0.01% by mass to 10% by mass, more preferably from 0.05% by mass to 5.0% by mass, still more preferably from 0.10% by mass to 3.0% by mass, and particularly preferably from 0.10% by mass to 2.0% by mass, with respect to the total amount of the non-aqueous electrolyte solution. When the content of the cyclic dicarbonyl compound (V) is within the range described above, the electrochemical device can operate without the SEI films compromising the conductivity of lithium cations. Further, the battery characteristics of the electrochemical device are improved, as the SEI films contain a cyclic dicarbonyl structure. When the content of the cyclic dicarbonyl compound (V) is within the range described above, the SEI films contain a sufficient amount of a structure mainly composed of a cyclic dicarbonyl. This facilitates the formation of a thermally and chemically stable inorganic salt or macromolecule structure. Therefore, the elution of the components of the SEI films which compromises the durability of the SEI films, the degeneration of the SEI films, and the like are less likely to occur, in a high temperature environment. As a result, the durability of the SEI films, and the properties after high-temperature storage of the electrochemical device are improved.

<Lithium Fluorophosphate Compound (VI)>

The non-aqueous electrolyte solution preferably further contains at least one compound (hereinafter, also referred to as "lithium fluorophosphate compound (VI)") selected from the group consisting of lithium monofluorophosphate and lithium difluorophosphate.

Lithium difluorophosphate is represented by the following Formula (VI-1), and lithium monofluorophosphate is represented by the following Formula (VI-2):

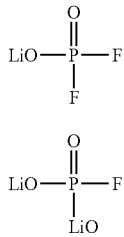

(VI-1)

(VI-2)

When the non-aqueous electrolyte solution according to the present disclosure contains the lithium fluorophosphate compound (VI) in addition to the chain sulfone compound (I) and the cyclic sulfone compound (II), a decrease in the capacity and an increase in the direct current resistance of the resulting electrochemical device is further suppressed, also in the charge-discharge cycles after being stored in a high temperature environment.

In a case in which the non-aqueous electrolyte solution contains the lithium fluorophosphate compound (VI), the content of the lithium fluorophosphate compound (VI) is preferably from 0.001% by mass to 5% by mass, more preferably from 0.01% by mass to 3% by mass, and still more preferably from 0.1% by mass to 2% by mass, with respect to the total amount of the non-aqueous electrolyte solution. When the content of the lithium fluorophosphate compound (VI) is within the range described above, the solubility of the lithium fluorophosphate compound (VI) in a non-aqueous solvent can be ensured. When the content of the lithium fluorophosphate compound (VI) is within the range described above, the direct current resistance of the electrochemical device can further be decreased.

<Non-Aqueous Solvent>

The non-aqueous electrolyte solution generally contains a non-aqueous solvent. The non-aqueous solvent can be selected as appropriate from various known non-aqueous solvents. Only one kind of non-aqueous solvent may be used, or two or more kinds thereof may be used in combination.

Examples of the non-aqueous solvent include cyclic carbonates, fluorine-containing cyclic carbonates, chain carbonates, fluorine-containing chain carbonates, aliphatic carboxylic acid esters, fluorine-containing aliphatic carboxylic acid esters, γ-lactones, fluorine-containing γ-lactones, cyclic ethers, fluorine-containing cyclic ethers, chain ethers, fluorine-containing chain ethers, nitriles, amides, lactams, nitromethane, nitroethane, sulfolane, trimethyl phosphate, dimethyl sulfoxide and dimethyl sulfoxide-phosphoric acid.

Examples of the cyclic carbonates include ethylene carbonate (EC), propylene carbonate (PC) and butylene carbonate (BC).

Examples of the fluorine-containing cyclic carbonates include fluoroethylene carbonate (FEC), difluoroethylene carbonate (DFEC) and trifluoropropylene carbonate.

Examples of the chain carbonates include dimethyl carbonate (DMC), diethyl carbonate (DEC), ethyl methyl carbonate (EMC), methyl propyl carbonate (MPC), ethyl propyl carbonate (EPC) and dipropyl carbonate (DPC).

Examples of the fluorine-containing chain carbonates include methyl 2,2,2-trifluoroethylcarbonate.

Examples of the aliphatic carboxylic acid esters include methyl formate, methyl acetate, methyl propionate, methyl butyrate, isomethyl butyrate, methyl trimethylbutyrate, ethyl formate, ethyl acetate, ethyl propionate, ethyl butyrate, ethyl isobutyrate and ethyl trimethylbutyrate.

Examples of the fluorine-containing aliphatic carboxylic acid esters include difluoromethyl acetate, 3,3,3-trifluoromethyl propionate, difluoroethyl acetate, 2,2,2-trifluoroethyl acetate.

Examples of the γ-lactones include γ-butyrolactone and γ-valerolactone.

Examples of the cyclic ethers include tetrahydrofuran, 2-methyltetrahydrofuran, tetrahydropyran, 1,3-dioxolane, 4-methyl-1,3-dioxolane, 1,3-dioxane and 1,4-dioxane.

Examples of the chain ethers include 1,2-ethoxyethane (DEE), ethoxymethoxyethane (EME), diethyl ether, 1,2-dimethoxyethane and 1,2-dibutoxyethane.

Examples of the fluorine-containing chain ethers include $HCF_2CF_2CH_2OCF_2CF_2H$, $CF_3CF_2CH_2OCF_2CF_2H$, $HCF_2CF_2CH_2OCF_2CFHCF_3$, $CF_3CF_2CH_2OCF_2CFHCF_3$, $C_6F_{13}OCH_3$, $C_6F_{13}OC_2H_5$, $C_8F_{17}OCH_3$, $C_8F_{17}OC_2H_5$, $CF_3CFHCF_2CH(CH_3)OCF_2CFHCF_3$, $HCF_2CF_2OCH(C_2H_5)_2$, $HCF_2CF_2OC_4H_9$, $HCF_2CF_2OCH_2CH(C_2H_5)_2$ and $HCF_2CF_2OCH_2CH(CH_3)_2$.

Examples of the nitriles include acetonitrile, glutaronitrile, adiponitrile, methoxyacetonitrile and 3-methoxypropionitrile.

Examples of the amides include N,N-dimethylformamide.

Examples of the lactams include N-methylpyrrolidinone, N-methyloxazolidinone and N,N'-dimethylimidazolidinone.

The non-aqueous solvent preferably contains at least one kind selected from the group consisting of cyclic carbonates, fluorine-containing cyclic carbonates, chain carbonates, and fluorine-containing chain carbonates. In this case, the total proportion of the cyclic carbonate(s), the fluorine-containing cyclic carbonate(s), the chain carbonate(s) and/or the fluorine-containing chain carbonate(s) is preferably from 50% by mass to 100% by mass, more preferably from 60% by mass to 100% by mass, and still more preferably from 80% by mass to 100% by mass, with respect to the total amount of the non-aqueous solvent.

The non-aqueous solvent preferably contains at least one kind selected from the group consisting of cyclic carbonates and chain carbonates. In this case, the total proportion of the cyclic carbonate(s) and/or the chain carbonate(s) in the non-aqueous solvent is preferably from 50% by mass to 100% by mass, more preferably from 60% by mass to 100% by mass, and still more preferably from 80% by mass to 100% by mass, with respect to the total amount of the non-aqueous solvent.

The content of the non-aqueous solvent is preferably from 60% by mass to 99% by mass, more preferably from 70% by mass to 97% by mass, and still more preferably from 70% by mass to 90% by mass, with respect to the total amount of the non-aqueous electrolyte solution.

The non-aqueous solvent preferably has an intrinsic viscosity at 25° C. of 10.0 m Pa·s or less, from the viewpoint of achieving a further improved electrolyte dissociability and ion mobility.

<Electrolyte>

The non-aqueous electrolyte solution generally contains an electrolyte.

The non-aqueous electrolyte solution preferably contains at least one of a lithium salt containing fluorine (hereinafter, also referred to as "fluorine-containing lithium salt") or a lithium salt which does not contain fluorine, as the electrolyte.

Examples of the fluorine-containing lithium salt include inorganic acid anion salts and organic acid anion salts.

Examples of the inorganic acid anion salts include lithium hexafluorophosphate ($LiPF_6$), lithium tetrafluoroborate ($LiBF_4$), lithium hexafluoroarsenate ($LiAsF_6$) and lithium hexafluorotantalate ($LiTaF_6$).

Examples of the organic acid anion salts include lithium trifluoromethanesulfonate ($LiCF_3SO_3$). Among these, $LiPF_6$ is particularly preferred as the fluorine-containing lithium salt.

Examples of the lithium salt which does not contain fluorine include lithium perchlorate ($LiClO_4$), lithium tetrachloroaluminate ($LiAlCl_4$) and lithium decachlorodecaboric acid ($Li_2B_{10}Cl_{10}$).

In a case in which the electrolyte contains the fluorine-containing lithium salt, the fluorine-containing lithium salt is preferably contained in a content ratio of from 50% by mass to 100% by mass, more preferably from 60% by mass to 100% by mass, and still more preferably from 80% by mass to 100% by mass, with respect to the total amount of the electrolyte.

In a case in which the fluorine-containing lithium salt contains lithium hexafluorophosphate ($LiPF_6$), the content ratio of lithium hexafluorophosphate ($LiPF_6$) is preferably from 50% by mass to 100% by mass, more preferably from 60% by mass to 100% by mass, and still more preferably from 80% by mass to 100% by mass, with respect to the total amount of the electrolyte.

In a case in which the non-aqueous electrolyte solution contains the electrolyte, the electrolyte is preferably contained in the non-aqueous electrolyte solution in a concentration of from 0.1 mol/L to 3 mol/L, and more preferably from 0.5 mol/L to 2 mol/L.

In a case in which the non-aqueous electrolyte solution contains lithium hexafluorophosphate ($LiPF_6$), the concentration of lithium hexafluorophosphate ($LiPF_6$) in the non-aqueous electrolyte solution is preferably from 0.1 mol/L to 3 mol/L, and more preferably from 0.5 mol/L to 2 mol/L.

<Other Component(s)>

The non-aqueous electrolyte solution may contain another component, if necessary.

Examples of the other component include acid anhydrides.

[Electrochemical Device Precursor]

Next, an electrochemical device precursor according to an embodiment of the present disclosure will be described.

The electrochemical device precursor according to the present embodiment includes a casing, a positive electrode, a negative electrode, a separator, and an electrolyte solution. The casing houses the positive electrode, the negative electrode, the separator, and the electrolyte solution. The positive electrode is configured to occlude and release lithium ions. The negative electrode is configured to occlude and release lithium ions. The separator separates the positive electrode from the negative electrode. The electrolyte solution comprises the non-aqueous electrolyte solution according to the present embodiment.

The electrochemical device precursor refers to an electrochemical device before being charged and discharged. In other words, the negative electrode does not include an SEI film and the positive electrode does not include an SEI film, in the electrochemical device precursor.

<Casing>

The shape and the like of the casing are not particularly limited, and can be selected as appropriate depending on the application and the like of the electrochemical device precursor according to the present embodiment. The casing may be, for example, a casing including a laminate film, or a casing composed of a battery can and a battery can lid.

<Positive Electrode>

The positive electrode preferably contains at least one positive electrode active material. The positive electrode active material is capable of occluding and releasing lithium ions.

The positive electrode according to the present embodiment includes a positive electrode current collector, and a positive electrode mixture layer. The positive electrode mixture layer is provided on at least a part of the surface of the positive electrode current collector.

The positive electrode current collector may be made of a material, such as, for example, a metal or an alloy. Specific examples of the material of the positive electrode current collector include aluminum, nickel, stainless steel (SUS) and copper. Among these, the material of the positive electrode current collector is preferably aluminum, from the viewpoint of balance between a high electrical conductivity and cost. The term "aluminum" as used herein refers to pure aluminum or an aluminum alloy. The positive electrode current collector is preferably an aluminum foil. The material of the aluminum foil is not particularly limited, and may be, for example, an A1085 or A3003 aluminum.

The positive electrode mixture layer contains a positive electrode active material and a binder.

The positive electrode active material is not particularly limited as long as the active material is a substance capable of occluding and releasing lithium ions, and can be adjusted as appropriate depending on the application and the like of the electrochemical device precursor.

The positive electrode active material may be, for example, a first oxide or a second oxide.

The first oxide contains lithium (Li) and nickel (Ni) as constituent metal elements.

The second oxide contains Li, Ni, and at least one metal element other than Li and Ni, as constituent metal elements. Examples of the metal element other than Li and Ni include transition metal elements and typical metal elements. The second oxide preferably contains a metal element other than Li and Ni in a proportion about the same as that of Ni, or in a proportion smaller than that of Ni, in terms of the number of atoms. The metal element other than Li and Ni can be, for example, at least one selected from the group consisting of Co, Mn, Al, Cr, Fe, V, Mg, Ca, Na, Ti, Zr, Nb, Mo, W, Cu, Zn, Ga, In, Sn, La and Ce. These positive electrode active materials may be used singly, or as a mixture of a plurality thereof.

The positive electrode preferably contains a lithium-containing composite oxide (hereinafter, also referred to as "NCM") represented by the following Formula (X), as the positive electrode active material. The lithium-containing composite oxide (X) has an advantage of having a high energy density per unit volume, and having an excellent thermal stability as well.

$$LiNi_aCo_bMn_cO_2 \qquad \text{Formula (X)}$$

In Formula (X), each of a, b and c independently represents a number of more than 0 but less than 1; and the total of a, b and c is from 0.99 to 1.00.

Specific examples of NCM include $LiNi_{0.33}Co_{0.33}Mn_{0.33}O_2$, $LiNi_{0.5}Co_{0.3}Mn_{0.2}O_2$, $LiNi_{0.5}Co_{0.2}Mn_{0.3}O_2$, $LiNi_{0.6}Co_{0.2}Mn_{0.2}O_2$ and $LiNi_{0.7}Co_{0.1}Mn_{0.1}O_2$.

The positive electrode active material may contain a lithium-containing composite oxide (hereinafter, also referred to as "NCA") represented by the following Formula (Y):

$$Li_tNi_{1-x-y}Co_xAl_yO_2 \quad \text{Formula (Y)}$$

In Formula (Y), t represents a number from 0.95 to 1.15, x represents a number from 0 to 0.3, y represents a number from 0.1 to 0.2, and the total of x and y is less than 0.5. Specific examples of NCA include $LiNi_{0.8}Co_{0.15}Al_{0.05}O_2$.

In a case in which the positive electrode in the electrochemical device precursor according to the present embodiment includes a positive electrode current collector, and a positive electrode mixture layer containing a positive electrode active material and a binder, the content of the positive electrode active material in the positive electrode mixture layer is preferably from 10% by mass to 99.9% by mass, more preferably from 30% by mass to 99% by mass, still more preferably from 50% by mass to 99% by mass, and particularly preferably from 70% by mass to 99% by mass, with respect to the total amount of the positive electrode mixture layer.

The binder may be, for example, polyvinyl acetate, polymethyl methacrylate, nitrocellulose, a fluororesin, or rubber particles.

Examples of the fluororesin include polytetrafluoroethylene (PTFE), polyvinylidene fluoride (PVDF), tetrafluoroethylene-hexafluoropropylene copolymers (FEP) and vinylidene fluoride-hexafluoropropylene copolymers.

Examples of the rubber particles include styrene-butadiene rubber particles and acrylonitrile rubber particles.

Among these, the binder is preferably a fluororesin, from the viewpoint of achieving an improved oxidation resistance of the positive electrode mixture layer. These binders can be used singly, or in combination of two or more kinds thereof, if necessary.

The content of the binder in the positive electrode mixture layer is preferably from 0.1% by mass to 4% by mass with respect to the total amount of the positive electrode mixture layer, from the viewpoint of physical properties of the positive electrode mixture layer (such as electrolyte solution permeability, peeling strength and the like) and battery performance in a balanced manner. When the content of the binder is within the range described above, a further improvement in adhesive properties of the positive electrode mixture layer to the positive electrode current collector and in binding properties between the molecules of the positive electrode active material can be achieved. When the content of the binder is within the range described above, the amount of the positive electrode active material in the positive electrode mixture layer can be increased to a higher level, resulting in an increase in the capacity.

The positive electrode mixture layer according to the present embodiment preferably contains an electrically conductive auxiliary.

A known electrically conductive auxiliary can be used as the material of the electrically conductive auxiliary. The known electrically conductive auxiliary is preferably a carbon material having electrical conductivity. Examples of the carbon material having electrical conductivity include graphite, carbon black, electrically conductive carbon fibers and fullerene. These materials can be used singly, or in combination of two or more kinds thereof. Examples of the electrically conductive carbon fibers include carbon nanotubes, carbon nanofibers and carbon fibers. Examples of the graphite include artificial graphite and natural graphite. Examples of the natural graphite include flake graphite, bulk graphite and earthy graphite.

The material of the electrically conductive auxiliary may be a commercially available product. Examples of the commercially available product of carbon black include: TOKABLACK #4300, #4400, #4500 and #5500, etc. (furnace black, manufactured by Tokai Carbon Co., Ltd.); PRINTEX L, etc. (furnace black, manufactured by Degussa AG); RAVEN 7000, 5750, 5250, 5000 ULTRA III and 5000 ULTRA, etc., CONDUCTEX SC ULTRA and CONDUCTEX 975 ULTRA, etc., PUER BLACK 100, 115 and 205, etc. (furnace black, manufactured by Columbian Chemicals Company); #2350, #2400B, #2600B, #30050B, #3030B, #3230B, #3350B, #3400B and #5400B, etc. (furnace black, manufactured by Mitsubishi Chemical Corporation); MONARCH 1400, 1300 and 900, VULCAN XC-72R, BLACK PEARLS 2000, LITX-50 and LITX-200, etc. (furnace black, manufactured by Cabot Corporation); ENSACO 250 G, ENSACO 260 G, ENSACO 350 G and Super-P (manufactured by Timcal Graphite & Carbon); Ketjen Black EC-300J and EC-600JD (manufactured by Akzo Nobel N.V.); and DENKA BLACK, DENKA BLACK HS-100 and FX-35, etc. (acetylene black, manufactured by Denka Co., Ltd.).

The positive electrode mixture layer according to the present embodiment may contain another component. Examples of the other component include thickeners, surfactants, dispersants, wetting agents and antifoaming agents.

<Negative Electrode>

The negative electrode contains at least one negative electrode active material. The negative electrode active material is capable of occluding and releasing lithium ions.

The negative electrode according to the present embodiment more preferably includes a negative electrode current collector and a negative electrode mixture layer. The negative electrode mixture layer is provided on at least a part of the surface of the negative electrode current collector.

The material of the negative electrode current collector is not particularly limited, and any known material, such as, for example, a metal or an alloy can be used arbitrarily. Specific examples of the material of the negative electrode current collector include aluminum, nickel, stainless steel (SUS), nickel plated steel and copper. Among these, the material of the negative electrode current collector is preferably copper, from the viewpoint of workability. The negative electrode current collector is preferably a copper foil.

The negative electrode mixture layer according to the present embodiment contains a negative electrode active material and a binder.

The negative electrode active material is not particularly limited as long as the active material is a substance capable of occluding and releasing lithium ions. The negative electrode active material is preferably, for example, at least one selected from the group consisting of lithium metal, a lithium-containing alloy, a metal or alloy capable of alloying with lithium, an oxide capable of being doped and dedoped with lithium ions, a transition metal nitride capable of being doped and dedoped with lithium ions, as well as a carbon material capable of being doped and dedoped with lithium ions. Among these, the negative electrode active material is preferably a carbon material capable of being doped and dedoped with lithium ions (hereinafter, referred to as "carbon material").

Examples of the carbon material include carbon black, activated carbon, graphite materials and amorphous carbon materials. These carbon materials may be used singly, or as a mixture of two or more kinds thereof. The carbon material may be, for example, in the form of fibers, spheres or flakes, but not particularly limited thereto. The carbon material preferably has a particle size of from 5 µm to 50 µm, and more preferably from 20 µm to 30 µm, but not particularly limited thereto.

Examples of the amorphous carbon material include hard carbon, cokes, mesocarbon microbeads (MCMB) calcined at or below 1500° C., and mesophase pitch-based carbon fibers (MCF).

Examples of the graphite material include natural graphite and artificial graphite. Examples of the artificial graphite include graphitized MCMB and graphitized MCF. The graphite material may contain boron. The graphite material may be coated with a metal or an amorphous carbon. The material of the metal for coating the graphite material may be, for example, gold, platinum, silver, copper or tin. The graphite material may be a mixture of an amorphous carbon and graphite.

The negative electrode mixture layer according to the present embodiment preferably contains an electrically conductive auxiliary. Examples of the electrically conductive auxiliary include the same electrically conductive auxiliaries as those exemplified as the electrically conductive auxiliaries which can be contained in the positive electrode mixture layer.

The negative electrode mixture layer according to the present embodiment may contain another component, in addition to the components described above. Examples of the other component include thickeners, surfactants, dispersants, wetting agents and antifoaming agents.

<Separator>

The separator may be, for example, a porous flat resin plate. The material of the porous flat resin plate may be, for example, a resin, or a nonwoven fabric containing the resin. Examples of the resin include polyethylene (PE), polypropylene (PP), polymethylpentene (PMP), polyesters, cellulose and polyamides.

In particular, the separator is preferably a porous resin sheet having a single layer or multi-layer structure. The material of the porous resin sheet is mainly composed of one kind or two or more kinds of polyolefin resins. The separator preferably has a thickness of from 5 µm to 30 µm. The separator is preferably disposed between the positive electrode and the negative electrode.

[One Example of Electrochemical Device Precursor]

One example of an electrochemical device precursor 1 according to an embodiment of the present disclosure will be specifically described with reference to the FIGURE. The FIGURE is a cross-sectional view of the electrochemical device precursor 1 according to an embodiment of the present disclosure.

The electrochemical device precursor 1 has a laminated structure. As shown in the FIGURE, the electrochemical device precursor 1 includes a battery element 10, a positive electrode lead 21, a negative electrode lead 22 and an exterior body 30. The battery element 10 is encapsulated in the interior of the exterior body 30. The exterior body 30 is made of a laminate film. Each of the positive electrode lead 21 and the negative electrode lead 22 is attached to the battery element 10. Each of the positive electrode lead 21 and the negative electrode lead 22 is arranged so as to extend from the interior of the exterior body 30 toward the exterior thereof, in a direction opposite from each other.

As shown in the FIGURE, the battery element 10 according to the present embodiment is formed by layering positive electrodes 11, separators 13 and negative electrodes 12. Each positive electrode 11 is composed of a positive electrode current collector 11A, and positive electrode mixture layers 11B formed on both main surfaces of the positive electrode current collector 11A. Each negative electrode 12 is composed of a negative electrode current collector 12A, and negative electrode mixture layers 12B formed on both main surfaces of the negative electrode current collector 12A. The positive electrode mixture layer 11B formed on one of the main surfaces of the positive electrode current collector 11A of the positive electrode 11, and the negative electrode mixture layer 12B formed on one of the main surfaces of the negative electrode current collector 12A of the negative electrode 12 adjacent to the positive electrode 11, are opposed to each other with the separator 13 interposed therebetween.

The non-aqueous electrolyte solution according to the present embodiment is injected into the interior of the exterior body 30 of the electrochemical device precursor 1. The positive electrode mixture layers 11B, the separators 13 and the negative electrode mixture layers 12B are impregnated with the non-aqueous electrolyte solution according to the present embodiment. In the electrochemical device precursor 1, adjoining positive electrode mixture layer 11B, separator 13 and negative electrode mixture layer 12B form one single battery layer 14. It is noted that the positive electrode 11 may be composed of the positive electrode current collector 11A, and the positive electrode mixture layer 11B formed on one of the main surfaces of the positive electrode current collector 11A, and that the negative electrode 12 may be composed of the negative electrode current collector 12A, and the negative electrode mixture layer 12B formed on one of the main surfaces of the negative electrode current collector 12A.

Although the electrochemical device precursor 1 has a laminated structure in the present embodiment, the present disclosure is not limited thereto, and the electrochemical device precursor 1 may have, for example, a wound structure. An electrochemical device precursor having a wound structure is obtained by layering a positive electrode, a separator, a negative electrode and a separator in the order mentioned, followed by winding in layers. Examples of the electrochemical device precursor having a wound structure include those in the form of a cylinder and rectangle.

In the present embodiment, the positive electrode lead 21 and the negative electrode lead 22 respectively protrude from the interior of the exterior body 30 toward the exterior thereof, in opposite directions with respect to the exterior body 30, as shown in the FIGURE. However, the present disclosure is not limited to this configuration. For example, the method of both of the positive electrode lead and the negative electrode lead may be configured to protrude from the interior of the exterior body 30 toward the exterior thereof, in the same direction with respect to the exterior body 30.

One example of an electrochemical device according to an embodiment of the present disclosure, which will be described below, may be, for example, an electrochemical device in which an SEI film has been formed on the surface of each of the positive electrode mixture layers 11B and the negative electrode mixture layers 12B in the electrochemical device precursor 1, by charging and discharging the electrochemical device precursor 1.

[Electrochemical Device]

Next, an electrochemical device according to an embodiment of the present disclosure will be described.

The electrochemical device according to the present embodiment is obtained by charging and discharging the electrochemical device precursor.

Specifically, the electrochemical device according to the present embodiment includes a casing, a positive electrode, a negative electrode, a separator, and an electrolyte solution. The positive electrode, the negative electrode, the separator, and the electrolyte solution are housed in the casing. The positive electrode is capable of occluding and releasing lithium ions. The negative electrode is capable of occluding and releasing lithium ions. The electrolyte solution is the non-aqueous electrolyte solution according to the present embodiment. The negative electrode includes an SEI film. The positive electrode includes an SEI film.

The electrochemical device according to the present embodiment differs from the electrochemical device precursor according to the present embodiment, mainly in the following first and second points: the first point is that the negative electrode includes an SEI film, and the second point is that the positive electrode includes an SEI film. In other words, the electrochemical device according to the present embodiment is the same as the electrochemical device precursor according to the present embodiment except for the first point and the second point. Therefore, the description of members constituting the electrochemical device according to the present embodiment other than the first point and the second point are omitted.

Regarding the first point, the definition of the expression "the negative electrode includes an SEI film" includes, in a case in which the negative electrode includes a negative electrode current collector and a negative electrode mixture layer, a first negative electrode form and a second negative electrode form. The first negative electrode form refers to a form in which an SEI film is formed on at least a part of the surface of the negative electrode mixture layer. The second negative electrode form refers to a form in which an SEI film is formed on the surface of the negative electrode active material as a constituent material of the negative electrode mixture layer.

Regarding the second point, the definition of the expression "the positive electrode includes an SEI film" includes, in a case in which the positive electrode includes a positive electrode current collector and a positive electrode mixture layer, a first positive electrode form and a second positive electrode form. The first positive electrode form refers to a form in which an SEI film is formed on at least a part of the surface of the positive electrode mixture layer. The second positive electrode form refers to a form in which an SEI film is formed on the surface of the positive electrode active material as a constituent material of the positive electrode mixture layer.

Each SEI film contains, for example, at least one selected from the group consisting of: a decomposition product of the chain sulfone compound (I); a decomposition product of the cyclic sulfone compound (II); a reaction product of the chain sulfone compound (I) or the cyclic sulfone compound (II) with an electrolyte; and a decomposition product of the reaction product.

The components of the SEI film on the positive electrode may be the same as, or different from the components of the SEI film on the negative electrode component. The film thickness of the SEI film on the positive electrode may be the same as, or different from the film thickness of the SEI film on the negative electrode.

[Method of Producing Electrochemical Device Precursor]

Next, a method of producing an electrochemical device precursor according to an embodiment of the present disclosure will be described.

The method of producing the electrochemical device precursor according to the present embodiment includes a first preparation step, a second preparation step, a third preparation step, a housing step, and an injection step. The housing step and the injection step are carried out in the order mentioned. Each of the first preparation step, the second preparation step, and the third preparation step is carried out before the housing step.

In the first preparation step, the positive electrode is prepared.

The positive electrode can be prepared, for example by a method in which a positive electrode mixture slurry is coated on a surface of the positive electrode current collector, followed by drying. The positive electrode mixture slurry contains a positive electrode active material and a binder.

The solvent to be contained in the positive electrode mixture slurry is preferably an organic solvent. The organic solvent may be, for example, N-methyl-2-pyrrolidone (NMP).

The method of coating the positive electrode mixture slurry is not particularly limited, and examples thereof include slot-die coating, slide coating, curtain coating and gravure coating. The method of drying the positive electrode mixture slurry is not particularly limited, and examples thereof include: drying with warm air, hot air or low humidity air; vacuum drying; and drying by infrared (such as far-infrared) irradiation. The drying is carried out preferably for a period of time from 1 minute to 30 minutes, but not particularly limited thereto. The drying is carried out preferably at a temperature of from 40° C. to 80° C., but not particularly limited thereto.

A dried product obtained by coating the positive electrode mixture slurry on the positive electrode current collector, followed by drying, is preferably subjected to a pressure treatment. This leads to a reduced porosity of the resulting positive electrode active material layer. The method of performing a pressure treatment include die pressing and roll pressing. In the second preparation step, the negative electrode is prepared.

The negative electrode can be prepared, for example by a method in which a negative electrode mixture slurry is coated on a surface of the negative electrode current collector, followed by drying. The negative electrode mixture slurry contains a negative electrode active material and a binder.

The solvent to be contained in the negative electrode mixture slurry may be, for example, water, or a liquid medium compatible with water. When the solvent contained in the negative electrode mixture slurry contains a liquid medium compatible with water, an improved coating properties on the negative electrode current collector can be achieved. Examples of the liquid medium compatible with water include alcohols, glycols, cellosolves, amino alcohols, amines, ketones, carboxylic acid amides, phosphoric acid amides, sulfoxides, carboxylic acid esters, phosphoric acid esters, ethers and nitriles.

Examples of the methods of coating and drying the negative electrode mixture slurry and the method of performing a pressure treatment on the resulting dried product include the same methods as those exemplified as the methods of coating and drying the positive electrode mixture slurry and of performing a pressure treatment on the dried product.

In the third preparation step, the non-aqueous electrolyte solution is prepared.

The method of preparing the non-aqueous electrolyte solution includes, for example: a step of dissolving an electrolyte in a non-aqueous solvent to obtain a solution; and a step of adding the chain sulfone compound (I) and the cyclic sulfone compound (II) to the resulting solution, followed by mixing, to obtain the non-aqueous electrolyte solution.

In the housing step, the positive electrode, the negative electrode and the separator are housed in the casing.

For example, in the housing step, the positive electrode, the negative electrode and the separator are used to produce a battery element. Subsequently, the positive electrode current collector of the positive electrode is electrically connected to the positive electrode lead, and the negative electrode current collector of the negative electrode is electrically connected to the negative electrode lead. Thereafter, the battery element is housed in the casing and fixed.

The method of electrically connecting the positive electrode current collector to the positive electrode lead is not particularly limited, and examples thereof include ultrasonic welding and resistance welding. The method of electrically connecting the negative electrode current collector to the negative electrode lead is not particularly limited, and examples thereof include ultrasonic welding and resistance welding.

The positive electrode, the negative electrode and the separator which are in a state housed in the casing is hereinafter referred to as an "assembly".

In the injection step, the non-aqueous electrolyte solution according to the present embodiment is injected into the interior of the assembly. This allows the positive electrode mixture layer, the separator, and the negative electrode mixture layer to be impregnated with the non-aqueous electrolyte solution. As a result, the electrochemical device precursor is obtained.

[Method of Producing Electrochemical Device]

Next, a method of producing an electrochemical device according to an embodiment of the present disclosure will be described.

The method of producing the electrochemical device according to the present embodiment includes a fourth preparation step and an aging step. The fourth preparation step and the aging step is carried out in the order mentioned.

In the fourth preparation step, the electrochemical device precursor is prepared. The method of preparing the electrochemical device precursor is the same as the method described in the method of producing the electrochemical device precursor.

In the aging step, the electrochemical device precursor is charged and discharged. As a result, SEI films are formed. In other words, the electrochemical device is obtained.

A treatment in which the electrochemical device precursor is charged and discharged is hereinafter referred to as "aging treatment".

The aging treatment may be carried out in an environment of from 25° C. to 70° C.

The aging treatment may include a first charging phase, a first maintenance phase, a second charging phase, a second maintenance phase, and a charging and discharging phase.

In the first charging phase, the electrochemical device precursor is charged in an environment of from 25° C. to 70° C. In the first maintenance phase, the electrochemical device precursor after the first charging phase is maintained in an environment of from 25° C. to 70° C. In the second charging phase, the electrochemical device precursor after the first maintenance phase is charged in an environment of from 25° C. to 70° C. In the second maintenance phase, the electrochemical device precursor after the second charging phase is maintained in an environment of from 25° C. to 70° C. In the charging and discharging phase, the electrochemical device precursor after the second maintenance phase is subjected to a combination of charging and discharging one or more times, in an environment of from 25° C. to 70° C.

Even when an electrochemical device obtained by the method of producing the electrochemical device according to the present embodiment is stored in a high temperature environment for a long period of time, the effect of reducing a decrease in the capacity and an increase in the direct current resistance of the electrochemical device can be more effectively obtained.

EXAMPLES

The embodiments according to the present disclosure will be described in specific detail, with reference to Examples. It is noted, however, that the present disclosure is in no way limited to these Examples.

Example 1

A non-aqueous electrolyte solution was obtained as follows.
(Preparation of Non-Aqueous Electrolyte Solution)

Ethylene carbonate (EC), dimethyl carbonate (DMC) and ethyl methyl carbonate (EMC) were mixed at a volume ratio of EC:DMC:EMC=30:35:35. As a result, a mixed solvent (non-aqueous solvent) as a non-aqueous solvent was obtained.

$LiPF_6$ (electrolyte) was dissolved in the resulting mixed solvent such that the concentration thereof in the finally obtained non-aqueous electrolyte solution was 1 mole/liter, to obtain an electrolyte solution.

The thus obtained electrolyte solution is hereinafter referred to as "base electrolyte solution".

A chain sulfone compound (I-1) and a cyclic sulfone compound (II-1), as additives, were added to the base electrolyte solution such that the contents (% by mass) thereof with respect to the total amount of the finally obtained non-aqueous electrolyte solution were the contents shown in Table 1. As a result, a non-aqueous electrolyte solution was obtained.

The chain sulfone compound (I-1) is represented by the following Formula (I-1). The cyclic sulfone compound (II-1) is represented by the following Formula (II-1).

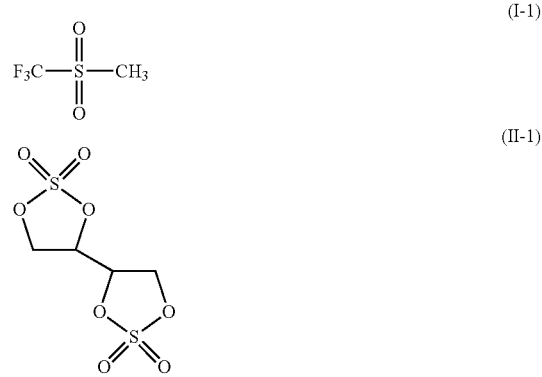

<Production of Electrochemical Device Precursor>

An aluminum-laminated battery as an electrochemical device precursor was produced as follows.
(First Preparation Step)

Positive electrodes were prepared as follows.

$Li(Ni_{0.5}Co_{0.2}Mn_{0.3}O_2)$ (94% by mass) as a positive electrode active material, carbon black (3% by mass) as an electrically conductive auxiliary, and polyvinylidene fluoride (PVDF) (3% by mass) as a binder were mixed, to obtain a mixture. The resulting mixture was dispersed in an N-methylpyrrolidone solvent, to obtain a positive electrode mixture slurry.

An aluminum foil having a thickness of 20 μm was prepared as a positive electrode current collector.

The resulting positive electrode mixture slurry was coated on the aluminum foil (positive electrode current collector), dried, and then rolled with a pressing machine, to obtain a positive electrode original plate. The thus obtained positive electrode original plate includes a region where an active material mixture layer (hereinafter, referred to as "positive electrode mixture layer") of the positive electrode has been formed, and a region (hereinafter, referred to as "un-coated portion for tab attachment") where the positive electrode mixture layer has not been formed. The un-coated portion for tab attachment is an un-coated portion that forms a margin.

The resulting positive electrode original plate was slit to obtain positive electrodes. The positive electrodes each include the positive electrode mixture layer(s) and the un-coated portion(s) for tab attachment. Each positive electrode mixture layer had a width of 29 mm and a length of 40 mm. Each un-coated portion for tab attachment had a width of 5 mm and a length of 11 mm.

(Second Preparation Step)

Negative electrodes were prepared as follows.

Graphite (96% by mass) as a negative electrode active material, carbon black (1% by mass) as an electrically conductive auxiliary, 1% by mass in terms of solid content of sodium carboxymethylcellulose dispersed in pure water, as a thickener, and 2% by mass in terms of solid content of styrene-butadiene rubber (SBR) dispersed in pure water, as a binder, were mixed, to obtain a negative electrode mixture slurry.

A copper foil having a thickness of 10 μm was prepared as a negative electrode current collector.

The resulting negative electrode mixture slurry was coated on the copper foil (negative electrode current collector), dried, and then rolled with a pressing machine, to obtain a negative electrode original plate. The thus obtained negative electrode original plate includes a region where an active material mixture layer (hereinafter, referred to as "negative electrode mixture layer") of the negative electrode has been formed, and a region (hereinafter, referred to as "un-coated portion for tab attachment") where the negative electrode mixture layer has not been formed. The un-coated portion for tab attachment is an un-coated portion that forms a margin.

The resulting negative electrode original plate was slit to obtain negative electrodes. The negative electrodes each include the negative electrode mixture layer(s) and the un-coated portion(s) for tab attachment. Each negative electrode mixture layer had a width of 30 mm and a length of 41 mm. Each un-coated portion for tab attachment had a width of 5 mm and a length of 11 mm.

(Third Preparation Step)

The non-aqueous electrolyte solution obtained in the production of the non-aqueous electrolyte solution described above was prepared.

(Housing Step)

Porous polypropylene films were prepared as separators.

The positive electrodes, the negative electrodes and the separators were layered in such an arrangement that the coated surfaces of the negative electrodes were in contact with the separators, and the coated surfaces of the positive electrodes were in contact with the separators, to obtain a laminated body. Subsequently, a positive electrode tab (positive electrode lead) made of aluminum was attached to the un-coated portions for tab attachment of the positive electrodes of the resulting laminated body, using an ultrasonic welder. A negative electrode tab (negative electrode lead) made of nickel was attached to the un-coated portions for tab attachment of the negative electrodes of the resulting laminated body, using an ultrasonic welder. The laminated body to which the positive electrode tab and the negative electrode tab had been attached, was sandwiched between a pair of laminate films (casing) each made of an aluminum whose both surfaces had been coated with resin layers. Thereafter, three sides of the laminate films were heat-sealed, to obtain a laminate assembly. At this time, the positive electrode tab and the negative electrode tab were arranged so as to protrude from one side adjacent to an opening which had not been sealed, of the three sides of the laminate assembly which had been sealed.

(Injection Step)

A quantity of 0.25 mL of the non-aqueous electrolyte solution obtained as described above was injected from the opening of the laminate assembly, and the opening of the laminate assembly was sealed. In this manner, an aluminum-laminated battery (electrochemical device precursor) was obtained.

Example 2 to Example 8, Comparative Example 1 to Comparative Example 7

Aluminum-laminated batteries (electrochemical device precursors) were obtained in the same manner as in Example 1, except that, in each of the Examples and Comparative Examples, the chain sulfone compound (I-1), the cyclic sulfone compound (II-1), a cyclic sulfone compound (C-1), a cyclic sulfone compound (C-2), a cyclic sulfone compound (C-3), vinylene carbonate (III-1), lithium bis(fluorosulfonyl)imide (IV-1), a cyclic dicarbonyl compound (V-2) and/or lithium difluorophosphate (VI-1), as an additive(s), was/were added to the base electrolyte solution, such that the content(s) (% by mass) thereof with respect to the total amount of the finally obtained non-aqueous electrolyte solution was/were the content(s) shown in Table 1.

The chain sulfone compound (I-1) is represented by the following Formula (I-1). The cyclic sulfone compound (II-1) is represented by the following Formula (II-1). The cyclic sulfone compound (C-1) is represented by the following Formula (C-1). The cyclic sulfone compound (C-2) is represented by the following Formula (C-2). The cyclic sulfone compound (C-3) is represented by the following Formula (C-3). Vinylene carbonate (III-1) is represented by the following Formula (III-1). Lithium bis(fluorosulfonyl)imide (IV-1) is represented by the following Formula (IV-1). The cyclic dicarbonyl compound (V-2) is represented by the following Formula (V-2). Lithium difluorophosphate (VI-1) is represented by the following Formula (VI-1).

(I-1)

-continued

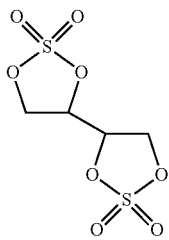
(II-1)

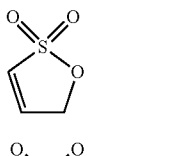
(C-1)

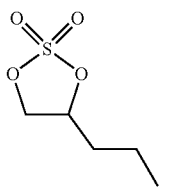
(C-2)

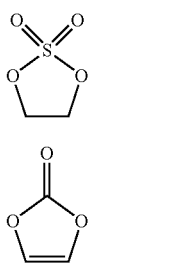
(C-3)

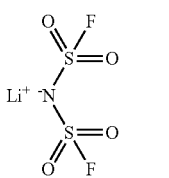
(III-1)

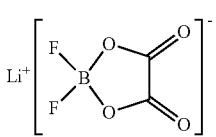
(IV-1)

(V-2)

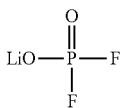
(VI-1)

[Evaluation Tests]

Each of the resulting aluminum-laminated batteries was subjected to the following aging treatment, to obtain a first battery. The resulting first battery was subjected to the following initial charge-discharge treatment to obtain a second battery. The resulting second battery was subjected to the following treatment for evaluating direct current resistance, to obtain a third battery. The resulting third battery was subjected to a high temperature-storage treatment to obtain a fourth battery. The resulting fourth battery was subjected to the following latter charge-discharge treatment, to obtain a fifth battery.

Using the thus obtained first to fifth batteries, the resistance after high-temperature storage and capacity retention rate were measured by the following measurement methods, for each of the batteries of Examples and Comparative examples. These measured results are shown in Table 1.

<Aging Treatment>

Each aluminum-laminated battery (electrochemical device battery precursor) was subjected to the following aging treatment to obtain a first battery.

The aluminum-laminated battery (electrochemical device battery precursor) was charged at an end voltage within a range of from 1.5 V to 3.5 V within a temperature range of from 25° C. to 70° C., and then the charging was stopped for a period of time within a range of from 5 hours to 50 hours. Subsequently, the battery precursor was charged at an end voltage within a range of from 3.5 V to 4.2 V within a temperature range of from 25° C. to 70° C., and maintained for a period of time within a range of from 5 hours to 50. Thereafter, the battery precursor was charged to 4.2 V, and then discharged to 2.5 V, within a temperature range of from 25° C. to 70° C. In this manner, each first battery was obtained.

<Initial Charge-Discharge Treatment>

Each resulting first battery was subjected to the following initial charge-discharge treatment to obtain a second battery.

The first battery was maintained in a temperature environment of 25° C. for 12 hours. Subsequently, the first battery was subjected to constant current-constant voltage charging (0.2 C-CCCV) to 4.2 V (SOC (state of charge): 100%) at a charging rate of 0.2 C, then the charging was stopped for 30 minutes, followed by constant current discharging to 2.5 V (0.2 C-CC) at a at a discharging rate of 0.2 C. The above-described operation was repeated for 3 cycles to stabilize the first battery. Thereafter, the first battery was subjected to constant current-constant voltage charging (0.5 C-CCCV) to 4.2 V at a charging rate of 0.2 C, then the charging was stopped for 30 minutes, followed by constant current discharging (1 C-CC) to 2.5 V at a discharging rate of 1 C. In this manner, each second battery was obtained.

<Treatment for Evaluating Direct Current Resistance>

Each resulting second battery was subjected to the following treatment for evaluating direct current resistance, to obtain a third battery.

The second battery was subjected to CCCV charging to 3.7 V at a charging rate of 0.2 C, in a temperature environment of 25° C. The "CCCV charging" refers to charging at a constant current and a constant voltage (Constant Current-Constant Voltage).

Subsequently, the second battery was left to stand in a temperature environment of −10° C. for 3 or more hours, to sufficiently cool the battery. Thereafter, the battery was subjected to CC10s discharging at a discharging rate of 0.1 C in a temperature environment of −10° C., and then subjected to CC10s charging at a charging rate of 0.1 C. The "CC10s discharging" refers to discharging at a constant current (Constant Current) for 10 seconds. The "CC10s charging" refers to charging at a constant current (Constant Current) for 10 seconds.

Subsequently, the second battery was subjected to CC10s discharging at a discharging rate of 0.2 C, and then subjected to CC20s charging at a charging rate of 0.1 C.

Subsequently, the second battery was subjected to CC10s discharging at a discharging rate of 0.4 C, and then subjected to CC40s charging at a charging rate of 0.1 C.

Subsequently, the second battery was subjected to CC10s discharging at a discharging rate of 0.6 C, and then subjected to CC60s charging at a charging rate of 0.1 C. In this manner, each third battery was obtained.

<High Temperature-Storage Treatment>

Each resulting third battery was subjected to the following high temperature-storage treatment to obtain a fourth battery.

The third battery was subjected to constant current charging to 4.2 V at a charging rate of 0.2 C, in a temperature environment of 25° C. Subsequently, the third battery in the state of charge was left to stand in an atmosphere of 60° C. for 28 days. In this manner, each fourth battery was obtained.

<Latter Charge-Discharge Treatment>

Each resulting fourth battery was subjected to the following latter charge-discharge treatment to obtain a fifth battery.

The heat of the fourth battery was allowed to dissipate in a temperature environment of 25° C., and the battery was subjected to a first discharging, then to a first charging, and then a second discharging. The "first discharging" above means performing constant current discharging (1 C-CC) to 2.5 V at a discharging rate of 1 C. The "first charging" above means performing constant current-constant voltage charging (0.2 C-CCCV) to 4.2 V at a charging rate of 0.2 C. The "second discharging" above means performing constant current discharging (1 C-CC) to 2.5 V at a discharging rate of 1 C. In this manner, each fifth battery was obtained.

<Method of Measuring Resistance after High-Temperature Storage>

As shown in the following Equation (X1), the relative value of the direct current resistance (specifically, direct current internal resistance: DCIR) of each of the fifth batteries of Comparative Example 2 to Comparative Example 7 and Example 1 to Example 8, with respect to the direct current resistance of the fifth battery of Comparative Example 1, was taken as the "resistance after high-temperature storage [%]" (see Table 1).

Resistance after high-temperature storage [relative value; %]=(direct current resistance [Ω] of fifth battery/direct current resistance [Ω] of fifth battery of Comparative Example 1)×100   (X1)

The direct current resistance was measured by the following method. Each fifth battery was subjected to the same treatment for evaluating direct current resistance, as the treatment for evaluating direct current resistance described above.

The direct current resistance (Ω) of the fifth battery was determined based on: each amount of decrease in voltage (=voltage before the start of discharging-voltage 10 seconds after the start of discharging) due to the "CC10s discharging" at each discharging rate of from 0.1 C to 0.6 C; and each current value (namely, current value corresponding to each discharging rate of from 0.1 C to 0.6).

<Method of Measuring Capacity Retention Rate>

As shown in the following Equation (X2), the relative value of the capacity retention rate of each of the fourth batteries of Comparative Example 2 to Comparative Example 7 and Example 1 to Example 8, with respect to the capacity retention rate of the fourth battery of Comparative Example 1, was taken as the "capacity retention rate [%]" (see Table 1).

Capacity retention rate [relative value; %]=(capacity retention rate/capacity retention rate of Comparative Example 1)×100   (X2)

In Equation (X2), the capacity retention rate is a value obtained by dividing the discharge capacity (mAh/g) of the fourth battery obtained when the second discharging in the latter charge-discharge treatment described above was performed, by the discharge capacity (mAh/g) of the first battery obtained when the last discharging in the initial charge-discharge treatment described above was performed.

The relative value of the discharge capacity of the fourth battery after having been subjected to a high temperature-storage test, corresponds to the rate of decrease (%) (hereinafter, also simply referred to as "rate of decrease in capacity") in the discharge capacity due to storage. The rate of decrease as used herein is the rate of decrease which is expressed as 100% when the capacity does not increase nor decrease, expressed as less than 100% when the capacity is decreased, and expressed as more than 100% when the capacity is increased.

The reason for having paid attention to the capacity retention rate is because, although having a large capacity value itself is an important performance, reducing a decrease in capacity due to deterioration or the like during storage period is also an extremely important performance, in battery performances.

TABLE 1

| | | Non-aqueous electrolyte solution Content of each additive | | | | | | | | Electrochemical device | |
| --- | --- | --- | --- | --- | --- | --- | --- | --- | --- | --- | --- |
| | | (I) | (II) | | | | (III) | (IV) | (V) | (VI) | | |
| | | (I-1) (% by mass) | (II-1) (% by mass) | (C-1) (% by mass) | (C-2) (% by mass) | (C-3) (% by mass) | (III-1) (% by mass) | (IV-1) (% by mass) | (V-2) (% by mass) | (VI-1) (% by mass) | Resistance after high-temperature storage [%] | Capacity retention rate [%] |
| Comparative Example 1 | 0.5 | — | — | — | — | — | — | — | — | 100 | 100 |
| Comparative Example 2 | — | 0.5 | — | — | — | — | — | — | — | 109 | 97 |
| Comparative Example 3 | 0.5 | — | 0.5 | — | — | — | — | — | — | 98 | 97 |
| Comparative Example 4 | 0.5 | — | — | 0.5 | — | — | — | — | — | 97 | 100 |
| Comparative Example 5 | 0.5 | — | — | — | 0.5 | — | — | — | — | 98 | 97 |
| Example 1 | 0.5 | 0.5 | — | — | — | — | — | — | — | 92 | 101 |
| Example 2 | 1.0 | 0.5 | — | — | — | — | — | — | — | 91 | 105 |
| Example 3 | 0.5 | 1.0 | — | — | — | — | — | — | — | 89 | 105 |
| Example 4 | 1.0 | 1.0 | — | — | — | — | — | — | — | 89 | 105 |
| Example 5 | 0.5 | 0.5 | — | — | — | 0.2 | — | — | — | 84 | 102 |
| Example 6 | 0.5 | 1.0 | — | — | — | — | 1.0 | — | — | 88 | 106 |

TABLE 1-continued

| | Non-aqueous electrolyte solution Content of each additive | | | | | | | | | Electrochemical device | |
|---|---|---|---|---|---|---|---|---|---|---|---|
| | (I) | (II) | | | | (III) | (IV) | (V) | (VI) | | |
| | (I-1) (% by mass) | (II-1) (% by mass) | (C-1) (% by mass) | (C-2) (% by mass) | (C-3) (% by mass) | (III-1) (% by mass) | (IV-1) (% by mass) | (V-2) (% by mass) | (VI-1) (% by mass) | Resistance after high-temperature storage [%] | Capacity retention rate [%] |
| Example 7 | 1.0 | 1.0 | — | — | — | — | — | 0.5 | — | 94 | 104 |
| Example 8 | 1.0 | 1.0 | — | — | — | — | — | — | 0.5 | 88 | 105 |
| Comparative Example 6 | 10 | — | — | — | — | — | — | — | — | 220 | 65 |
| Comparative Example 7 | 30 | — | — | — | — | — | — | — | — | 358 | 30 |

In Table 1, "Content of each additive" indicates the content [% by mass] of each additive with respect to the total amount of the non-aqueous electrolyte solution. In Table 1, the symbol "-" indicates that the corresponding component is not contained.

The non-aqueous electrolyte solution of Comparative Example 2 contained the cyclic sulfone compound (II-1) singly. Therefore, the electrochemical device of Comparative Example 2 showed a resistance after high-temperature storage of 109% and a capacity retention rate of 97%, with respect to the electrochemical device in which the non-aqueous electrolyte solution of Comparative Example 1 containing the chain sulfone compound (I-1) singly was used. In other words, it has been found out that a decrease in the capacity and an increase in the direct current resistance of the electrochemical device are not suppressed in the electrochemical device of Comparative Example 2, when the device is stored in a high temperature environment for a long period of time.

Each of the non-aqueous electrolyte solutions of Comparative Example 3 to Comparative Example 5 contained the cyclic sulfone compound (C-1), the cyclic sulfone compound (C-2) or the cyclic sulfone compound (C-3), and did not contain the cyclic sulfone compound (II). Therefore, the electrochemical devices of Comparative Example 3 to Comparative Example 5 each showed a capacity retention rate of 100% or less, with respect to the electrochemical device of Comparative Example 1. In other words, it has been found out that a decrease in the capacity of the electrochemical devices is not suppressed in the electrochemical devices of Comparative Example 3 to Comparative Example 5, when the devices are stored in a high temperature environment for a long period of time.

Each of the non-aqueous electrolyte solutions of Comparative Example 6 and Comparative Example 7 contained the chain sulfone compound (I-1) singly, and the content of the chain sulfone compound (I-1) therein was 20 times or more with respect to the content of the chain sulfone compound (I-1) in Comparative Example 1. Therefore, the electrochemical devices of Comparative Example 6 and Comparative Example 7 each showed a resistance after high-temperature storage of 220% or more and a capacity retention rate of 65% or less, with respect to the electrochemical device in which the non-aqueous electrolyte solution of Comparative Example 1 was used. In other words, it has been found out that a decrease in the capacity and an increase in the direct current resistance of the electrochemical devices are not suppressed in the electrochemical devices of Comparative Example 6 and Comparative Example 7, when the devices are stored in a high temperature environment for a long period of time.

In contrast, each of the non-aqueous electrolyte solutions of Example 1 to Example 8 contains the chain sulfone compound (I-1) and the cyclic sulfone compound (II-1). Therefore, the electrochemical devices of Example 1 to Example 8 each showed a resistance after high-temperature storage of 94% or less and a capacity retention rate of 101% or more, with respect to the electrochemical device of Comparative Example 1. In other words, it has been found out that a decrease in the capacity and an increase in the direct current resistance of the electrochemical devices are suppressed in the electrochemical devices of Example 1 to Example 8, even when the devices are stored in a high temperature environment for a long period of time.

Comparison of Example 1 with Example 3, and comparison of Example 2 with Example 4 revealed that adjusting the content of the cyclic sulfone compound (II-1) to more than 0.5% by mass leads to a reduced resistance after high-temperature storage. In other words, it has been found out that an increase in the direct current resistance of the electrochemical device can further be suppressed even when the electrochemical device is stored in a high temperature environment for a long period of time, by adjusting the content of the cyclic sulfone compound (II-1) to more than 0.5% by mass.

The disclosure of Japanese Patent Application No. 2021-045217 filed on Mar. 18, 2021, and the disclosure of Japanese Patent Application No. 2021-137178 filed on Aug. 25, 2021 are incorporated herein by reference in their entirety.

All publications, patent applications, and technical standards mentioned in the present specification are incorporated herein by reference to the same extent as in a case in which each individual publication, patent application, or technical standard was specifically and individually indicated to be incorporated by reference.

The invention claimed is:

1. A non-aqueous electrolyte solution, comprising:
   an chain sulfone compound (I) represented by the following Formula (I); and
   a cyclic sulfone compound (II) represented by the following Formula (II),
   wherein a content of the chain sulfone compound (I) is from 0.01% by mass to 10% by mass with respect to a total amount of the non-aqueous electrolyte solution:

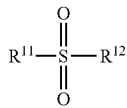

(I)

wherein, in Formula (I), each of $R^{11}$ and $R^{12}$ independently represents an alkyl group having from 1 to 6 carbon atoms, or a fluorinated alkyl group having from 1 to 6 carbon atoms:

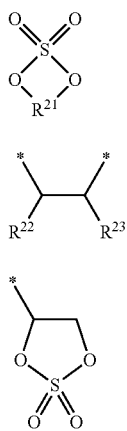

(II)

(ii-1)

(ii-2)

wherein, in Formula (II), $R^{21}$ represents an a group represented by Formula (ii-1), and * represents a binding site; and wherein, in Formula (ii-1), $R^{22}$ represents a hydrogen atom, an alkyl group having from 1 to 6 carbon atoms, or a group represented by Formula (ii-2), $R^{23}$ represents an alkyl group having from 1 to 2 carbon atoms, or a group represented by Formula (ii-2), and at least one of $R^{22}$ or $R^{23}$ is a group represented by Formula (ii-2).

2. The non-aqueous electrolyte solution according to claim 1, wherein $R^{11}$ is a fluorinated alkyl group having from 1 to 6 carbon atoms.

3. The non-aqueous electrolyte solution according to claim 1, further comprising a cyclic carbonate compound (III) containing an unsaturated bond represented by the following Formula (III):

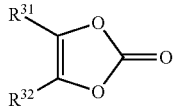

(III)

wherein, in Formula (III), each of $R^{31}$ and $R^{32}$ independently represents a hydrogen atom, a methyl group, an ethyl group, or a propyl group.

4. The non-aqueous electrolyte solution according to claim 1, further comprising a sulfonimide lithium salt compound (IV) represented by the following Formula (IV):

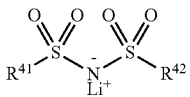

(IV)

wherein, in Formula (IV), each of $R^{41}$ and $R^{42}$ independently represents a fluorine atom, a trifluoromethyl group, or a pentafluoroethyl group.

5. The non-aqueous electrolyte solution according to claim 1, further comprising a cyclic dicarbonyl compound (V) represented by the following Formula (V):

$$(M^+)_b \left[ (R^{52})_n - Y \begin{pmatrix} Q^1 \\ \diagdown \\ Q^2 \end{pmatrix} \begin{pmatrix} O \\ \diagdown \\ O \end{pmatrix} (R^{51})_q \right]_m^{b-}$$

(V)

wherein, in Formula (V),

M represents an alkali metal;

Y represents a transition element, or a group 13 element, a group 14 element or a group 15 element of the periodic table;

b represents an integer from 1 to 3;

m represents an integer from 1 to 4;

n represents an integer from 0 to 8;

q represents 0 or 1;

$R^{51}$ represents an alkylene group having from 1 to 10 carbon atoms, a halogenated alkylene group having from 1 to 10 carbon atoms, an arylene group having from 6 to 20 carbon atoms, or a halogenated arylene group having from 6 to 20 carbon atoms, wherein each of these groups may contain a substituent or a hetero atom in their structure, and in a case in which q is 1 and m is an integer from 2 to 4, a number of $R^{51}$s corresponding to m may be bound to one another;

$R^{52}$ represents a halogen atom, an alkyl group having from 1 to 10 carbon atoms, a halogenated alkyl group having from 1 to 10 carbon atoms, an aryl group having from 6 to 20 carbon atoms, or a halogenated aryl group having from 6 to 20 carbon atoms, wherein each of these groups may contain a substituent or a hetero atom in their structure, and in a case in which n is an integer from 2 to 8, a number of $R^{52}$s corresponding to n may be bound to one another to form a ring; and each of $Q^1$ and $Q^2$ independently represents an oxygen atom or a carbon atom.

6. The non-aqueous electrolyte solution according to claim 1, further comprising at least one compound (VI) selected from the group consisting of lithium monofluorophosphate and lithium difluorophosphate.

7. An electrochemical device precursor, comprising:

a casing; and a positive electrode, a negative electrode, a separator and an electrolyte solution housed in the casing, wherein:

the positive electrode is configured to occlude and release lithium ions, the negative electrode is configured to occlude and release lithium ions, and the electrolyte solution comprises the non-aqueous electrolyte solution according to claim 1.

8. The electrochemical device precursor according to claim 7, wherein the positive electrode comprises, as a positive electrode active material, a lithium-containing composite oxide represented by the following Formula (X):

$$LiNi_aCo_bMn_cO_2 \qquad \text{Formula (X)}$$

wherein, in Formula (X), each of a, b and c independently represents a number of more than 0 but less than 1; and a total of a, b and c is from 0.99 to 1.00.

9. A method of producing an electrochemical device, the method comprising:
preparing the electrochemical device precursor according to claim 7; and
charging and discharging the electrochemical device precursor.

10. An electrochemical device obtained by charging and discharging the electrochemical device precursor according to claim 7.

* * * * *